United States Patent
Emmons et al.

(10) Patent No.: US 10,180,076 B2
(45) Date of Patent: Jan. 15, 2019

(54) REDUNDANT SPEED SUMMING ACTUATORS

(71) Applicant: Hamilton Sundstrand Corporation, Charlotte, NC (US)

(72) Inventors: Floyd R. Emmons, West Hartford, CT (US); Gregory DiVincenzo, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 786 days.

(21) Appl. No.: 14/727,029

(22) Filed: Jun. 1, 2015

(65) Prior Publication Data

US 2016/0348529 A1    Dec. 1, 2016

(51) Int. Cl.
| | |
|---|---|
| F01D 17/14 | (2006.01) |
| F01D 17/08 | (2006.01) |
| F01D 21/10 | (2006.01) |
| F02C 1/04 | (2006.01) |
| F01D 9/04 | (2006.01) |
| F01D 17/02 | (2006.01) |
| F04D 27/02 | (2006.01) |
| F02C 9/20 | (2006.01) |
| G05B 9/03 | (2006.01) |
| F01D 17/20 | (2006.01) |

(52) U.S. Cl.
CPC ............. *F01D 17/14* (2013.01); *F01D 9/041* (2013.01); *F01D 17/02* (2013.01); *F01D 17/20* (2013.01); *F02C 9/20* (2013.01); *F04D 27/0246* (2013.01); *G05B 9/03* (2013.01); *F05D 2240/12* (2013.01); *F05D 2260/40311* (2013.01); *F05D 2260/57* (2013.01); *F05D 2260/84* (2013.01); *F05D 2270/62* (2013.01)

(58) Field of Classification Search
CPC ........ F01D 17/20; F01D 17/162; F01D 17/08; F01D 21/10; F01D 17/14; F02C 9/20; F02C 1/04
See application file for complete search history.

(56) References Cited

U.S. PATENT DOCUMENTS 5,206,810 A     4/1993  Bools et al.
5,896,736 A  *  4/1999  Rajamani ................. F02C 9/20
                                                  60/773

(Continued)

FOREIGN PATENT DOCUMENTS

DE          3926705 A1     6/1990

OTHER PUBLICATIONS

EPSR in EP Application No. 16163333.4 dated Oct. 25, 2016, 7 pages.

*Primary Examiner* — Yuri Kan
(74) *Attorney, Agent, or Firm* — Cantor Colburn LLP

(57) ABSTRACT

A method and system for use with actuation system to control a plurality of vanes disposed within a turbine engine, wherein a vane position sensor provides a vane position signal corresponding to a vane position of the plurality of vanes, the actuation system includes a plurality of motors engaged in response to the vane position signal, and a differential gearbox having a plurality of inputs operatively coupled to the plurality of motors and an output operatively coupled to the plurality of vanes, wherein an output speed of the output is a sum of a plurality of input speeds of the plurality of inputs.

15 Claims, 2 Drawing Sheets

(56) References Cited

U.S. PATENT DOCUMENTS

| | | | |
|---|---|---|---|
| 6,364,602 B1* | 4/2002 | Andrew | F01D 21/10 |
| | | | 415/1 |
| 6,722,845 B2 | 4/2004 | Chard et al. | |
| 7,096,657 B2 | 8/2006 | Mahoney et al. | |
| 8,376,693 B2 | 2/2013 | Gilman et al. | |
| 8,757,977 B2 | 6/2014 | Swift et al. | |
| 8,979,694 B2 | 3/2015 | Holmes et al. | |
| 2005/0147492 A1* | 7/2005 | Mahoney | F01D 17/162 |
| | | | 415/148 |
| 2009/0297334 A1* | 12/2009 | Norris | F01D 17/08 |
| | | | 415/49 |
| 2012/0259483 A1 | 10/2012 | Villano et al. | |
| 2013/0098052 A1* | 4/2013 | Bedrine | F02C 1/04 |
| | | | 60/772 |
| 2014/0042269 A1 | 2/2014 | Zantz et al. | |
| 2014/0169948 A1 | 6/2014 | Kay et al. | |

* cited by examiner

REDUNDANT SPEED SUMMING
ACTUATORS

STATEMENT OF GOVERNMENTAL INTEREST

This invention was made with Government support under contract number N00014-09-D-0821-0006 awarded by the United States Navy. The Government has certain rights in the invention.

BACKGROUND

The subject matter disclosed herein relates to actuation systems, and, more particularly, to a system and a method for providing actuation systems to control a plurality of vanes within a turbine engine.

Typically, an aircraft turbine engine includes variable geometry components, such as compressor stator vanes. Variable geometry components can allow for enhanced control and efficiency for turbine engines.

Redundant actuators are utilized in flight critical applications to control the position of the variable geometry components. Electrical actuators for use with variable geometry components can contain bearings and gears that may prevent the use of redundant electrical actuators in flight critical applications.

BRIEF SUMMARY

According to an embodiment, an actuation system to control a plurality of vanes disposed within a turbine engine, wherein a vane position sensor provides a vane position signal corresponding to a vane position of the plurality of vanes, includes a plurality of motors engaged in response to the vane position signal, and a differential gearbox having a plurality of inputs operatively coupled to the plurality of motors and an output operatively coupled to the plurality of vanes, wherein an output speed of the output is a sum of a plurality of input speeds of the plurality of inputs.

According to an embodiment, a method for controlling a plurality of vanes disposed within a turbine engine, wherein a vane position signal corresponding to a vane position of the plurality of vanes is provided via a vane position sensor, includes engaging a plurality of motors in response to the vane position signal, providing a plurality of input speeds to a plurality of inputs of a differential gearbox via the plurality of motors, providing an output speed to an output operatively coupled to the plurality of vanes via the differential gearbox, wherein the output speed of the output is a sum of the plurality of input speeds of the plurality of inputs.

According to an embodiment, a multiple redundant actuation system to control a plurality of vanes disposed within a turbine engine, wherein a vane position sensor provides a vane position signal corresponding to a vane position of the plurality of vanes, includes a plurality of actuation systems, wherein each actuation system includes a plurality of motors engaged in response to the vane position signal, a differential gearbox having a plurality of inputs operatively coupled to the plurality of motors and an output operatively coupled to the plurality of vanes, wherein an output speed of the output is a sum of a plurality of input speeds of the plurality of inputs.

Technical function of the embodiments described above the actuation system includes a plurality of motors engaged in response to the vane position signal, and a differential gearbox having a plurality of inputs operatively coupled to the plurality of motors and an output operatively coupled to the plurality of vanes, wherein an output speed of the output is a sum of a plurality of input speeds of the plurality of inputs.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
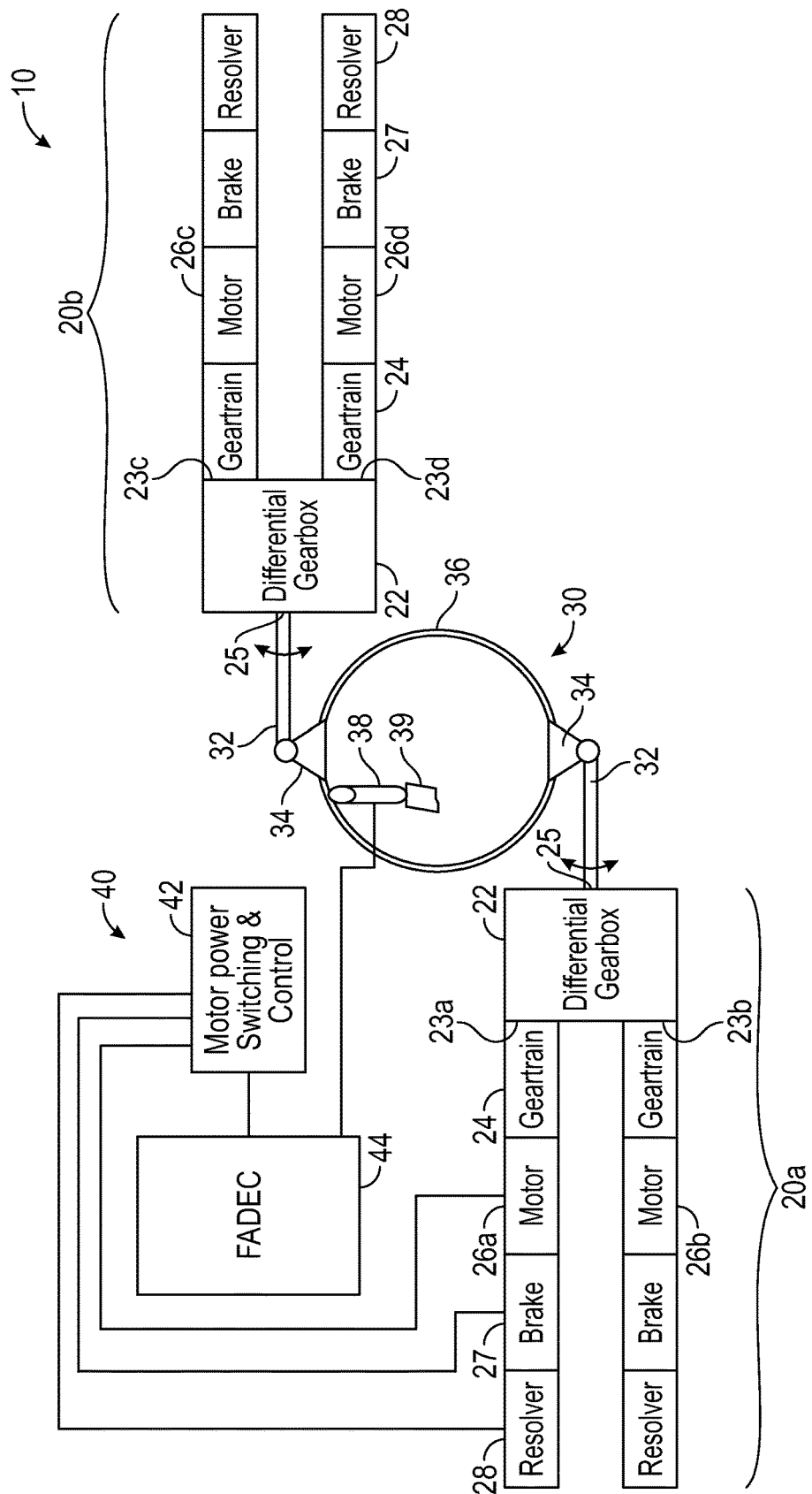
FIG. 1 illustrates a schematic view of one embodiment of a multiple redundant actuation system.

Referring now to the drawings, FIG. 1 illustrates a schematic view of multiple redundant actuation system 10. In the illustrated embodiment, multiple redundant actuation system 10 can include at least one redundant actuation system 20a/20b (generally referred to as redundant actuation system 20), vane actuation system 30, and control system 40. In the illustrated embodiment, multiple redundant actuation system 10 can be utilized to selectively actuate vanes 39 within a turbine engine to adjust operational parameters for efficiency and output parameters. Advantageously, multiple redundant actuation system 10 can offer multiple levels of redundancy and allows for the use of electrical actuators/motors 26a/26b/26c/26d (generally referred to as motors 26) and other actuators with jamming type failure modes. Further, the use of electrical actuators/motors 26 allows for load sensing capabilities, as well as enhanced control of vanes 39.

In the illustrated embodiment, multiple redundant actuation system 10 includes a plurality of redundant actuation systems 20a/20b to adjust vanes 39. In the illustrated embodiment, redundant actuation system 20a/20b each includes differential gearbox 22 coupled to a plurality of motors 26a/26b or 26c/26d. In the illustrated embodiment, the rotational energy of motors 26 and differential gearbox 22 is utilized to translate vanes 39 within a turbine engine.

In the illustrated embodiment, at least one motor 26 is operatively coupled to differential gearbox 22 via gear train 24 at inputs 23a/23b/23c/23d (generally referred to as input 23). In the illustrated embodiment, the motors 26 are electrical actuators, however in other embodiments, the motors 26 can be any suitable motor. Advantageously, by utilizing electrical motors 26, load information of motors 26 can be determined via feedback received from motor power switching and control 42. Load information can be utilized to determine and augment vane 39 position information. In the illustrated embodiment, motors 26a/26b and/or 26c/26d provide rotational motion to differential gearbox 22. In response to position requirements of vane 39, motors 26 can be adjusted for speed, rotation direction, output torque, etc. to adjust vane 39 position.

In the illustrated embodiment, motors 26a/26b and/or 26c/26d are in a redundant arrangement. Typically, motors 26 are selected wherein each motor 26 has the capability to actuate vanes 39 independently. In the illustrated redundant arrangement, redundant motors 26 operate at less than full output capability until a failure event occurs.

During operation, one or more motors 26 (e.g., 26a or 26b) can experience motor failure such as bearing or gear failure, causing a jamming type failure. Advantageously, due to the redundant arrangement of motors 26a/26b and the speed summing configuration of differential gearbox 22, one of the operational motors 26a/26b can provide sufficient rotational energy to continue actuating vanes 39 as desired even if the other motor 26a/26b has failed. In certain embodiments, an additional redundant actuation system 20b of multiple redundant actuation system 10 can be utilized alone or in parallel with a remaining functional motor 26.

In the illustrated embodiment, brake 27 selectively engages upon motor 26. In the event of motor 26 failure, brake 27 can brake motor 26 to prevent rotation. When used with a speed summing arrangement such as differential gearbox 22, brake 27 can allow the rotational input of a functional motor 26 to be transferred to an output shaft instead of transferring rotational input to nonfunctional motor 26.

In the illustrated embodiment, resolvers 28 are associated with motors 26. Resolvers 28 provide indexed position information of the motors 26 to determine the rotational position of each motor 26. Position information from resolvers 28 can be provided to control system 40 to determine operational bounds of motors 26 and desired operation relative to current motor position 26. In certain embodiments, resolvers 28 can be rotary variable differential transformers.

In the illustrated embodiment, geartrain 24 operatively couples the motor 26 to the differential gearbox 22. Geartrain 24 can provide speed multiplication or reduction to the output of motor 26 transmitted to the differential gearbox 22.

In the illustrated embodiment, differential gearbox 22 includes a plurality of inputs 23 and output 25. In the illustrated embodiment, each input 23 is operatively coupled to a motor 26. In certain embodiments, a plurality of motors 26 (e.g. 26a and 26b) are each coupled to the inputs 23 (e.g. 23a and 23b) via a respective geartrain 24. Differential gearbox 22 can be configured to provide speed summing functionality, wherein the speeds of inputs 23 (e.g. 23a and 23b) are summed together to provide a summed output speed of output 25. Differential gearbox 22 can utilize speed summing techniques that are known in the art. In certain embodiments, speed summing can be accomplished by the use of planetary gearsets to sum the input 23 speeds together. The summed output speed is output to output 25. Output 25 can be operatively coupled to vane actuation system 30 to actuate vanes 39. In the illustrated embodiment, multiple differential gearboxes 22 of redundant actuation systems 20a/20b can be coupled to vane actuation system 30 to form multiple redundant actuation system 10.

In the event of a failure of a motor 26 (e.g. 26a or 26b), one of the inputs 23 (e.g. 23a or 23b) may not receive any rotational input or reduced rotational input. Control system 40 can increase speed of another motor 26a/26b coupled to another input 23a/23b to maintain a required output 25 speed to actuate vane 39. In certain embodiments, brake 27 is applied to nonfunctioning motor 26a/26b to prevent rotational energy to being transferred from one functioning motor 26a or 26b to the nonfunctioning motor 26a or 26b.

In the illustrated embodiment, vane actuation system 30 is actuated by at least one redundant actuation system 20a. Further, in the illustrated embodiment, vane actuation system 30 is actuated by a plurality of redundant actuation systems (e.g., redundant system 20a and 20b) to increase redundancy and prevent distortion of vane actuation system 30 components.

In the illustrated embodiment, the output 25 of each differential gearbox 22 is operatively connected to vane actuation system 30 via torque tube 32. Torque tube 32 can transmit torque and rotational energy from the output 25 to vanes 39 via linkage 34 and synchronization ring 36. Torque tube 32 can be any suitable transmission device, including a CV joint, a flexible link, etc.

In the illustrated embodiment, torque tube 32 is operatively coupled to a linkage 34 to convert the rotational motion of torque tube 32 to translate synchronization ring 36. In certain embodiments, linkage 34 is a dog bone linkage, known in the art to convert rotational motion to translational motion. In the illustrated embodiment, synchronization ring 36 is connected to a plurality of redundant actuation systems 20a/20b spaced apart to minimize distortion of synchronization ring 36.

In the illustrated embodiment, synchronization ring 36 is operatively coupled to a plurality of redundant actuation systems 20a/20b via torque tubes 32. Synchronization ring 36 allows for actuation of vanes 39 attached within. Typically, synchronization ring 36 circumvents a turbine engine and allows vanes 39, disposed within the engine to be actuated.

Redundant actuation system 20 allows synchronization ring 36 to be rotated clockwise and counterclockwise to actuate the vanes 39 within. In the illustrated embodiment, multiple redundant actuation system 10 is utilized to allow a "push-pull" configuration of torque tubes 32 to allow for redundancy and prevent distortion of synchronization ring 36.

In the illustrated embodiment, vanes 39 are dynamically controlled by the redundant actuation system 20 to allow for variable geometry within a turbine engine. FIG. 1 only shows one vane 39 for clarity, however a plurality of vanes 39 can be utilized. Vanes 39 can be located within a stator portion of a turbine engine, in portions such as the high pressure turbine section, low pressure turbine section, etc. By altering the position of the vanes 39 the performance and efficiency of the subject engine can be altered. During operation, aerodynamic loads are exerted upon vanes 39. Advantageously, such loads can be sensed as feedback received via load information from motors 26.

In the illustrated embodiment, vane position sensor 38 reports the position of vanes 39 within the engine. Vane position sensor 38 feedback can be used to determine further input from redundant actuation system 20 and can be utilized by control system 40. Vane position sensor 38 can be any suitable type of sensor to withstand high pressure and high temperature environments while providing feedback to control systems 40 to allow redundant actuation system 20 to operate.

In the illustrated embodiment, control system 40 can receive feedback from at least one of vane position sensor 38, motors 26, and resolvers 28 to control the position of vanes 39 and maintain motors 26 within operational limits. In the illustrated embodiment, control system 40 includes motor power switching and control 42 and FADEC 44. Schematically, motor power switching and control 42 and FADEC 44 are only shown connected to several components of redundant actuation system 20 for clarity, however motor power switching and control 42, and FADEC 44 can be connected to any number of components of redundant actuation system 20 and any number of redundant actuation systems 20a/20b.

In the illustrated embodiment, FADEC (Full Authority Digital Engine Control) 44 receives inputs from vane position sensor 38, load information from motor 26 and motor position information from resolver 28. FADEC 44 can be utilized to control the position of vanes 39 by providing appropriate inputs to motor 26. In the illustrated embodiment, FADEC 44 works in conjunction with motor power switching and control 42 to receive motor 26 parameters and provide output to motors 26. FADEC 44 can contain or can receive instructions (from other control systems or operators) and/or conditions regarding vane 39 positions with respect to operating conditions and demands.

In the illustrated embodiment, motor power switching and control 42 can receive feedback from resolver 28, brake 27, and motor 26, and send control signals to brake 27 and motor 26. In the illustrated embodiment, motor power switching and control 42 can send and receive signals from FADEC 44 to work in conjunction with FADEC 44. Motor power switching and control 42 can receive signals to adjust the speed of motor 26, reverse the direction of motor 26, monitor the shaft position of motor 26 via resolver 28, and apply brake 27 to motor 26.

FADEC 44 in conjunction with motor power switching and control 42 can utilize vane 39 position information from vane position sensor 38, load information from motor 26, and motor position information from resolver 28, along with operational demands to determine the output upon motor 26 to position vane 39 in the desired orientation while keeping motor 26 and vanes 39 within proper operational bounds.

Figure 2:
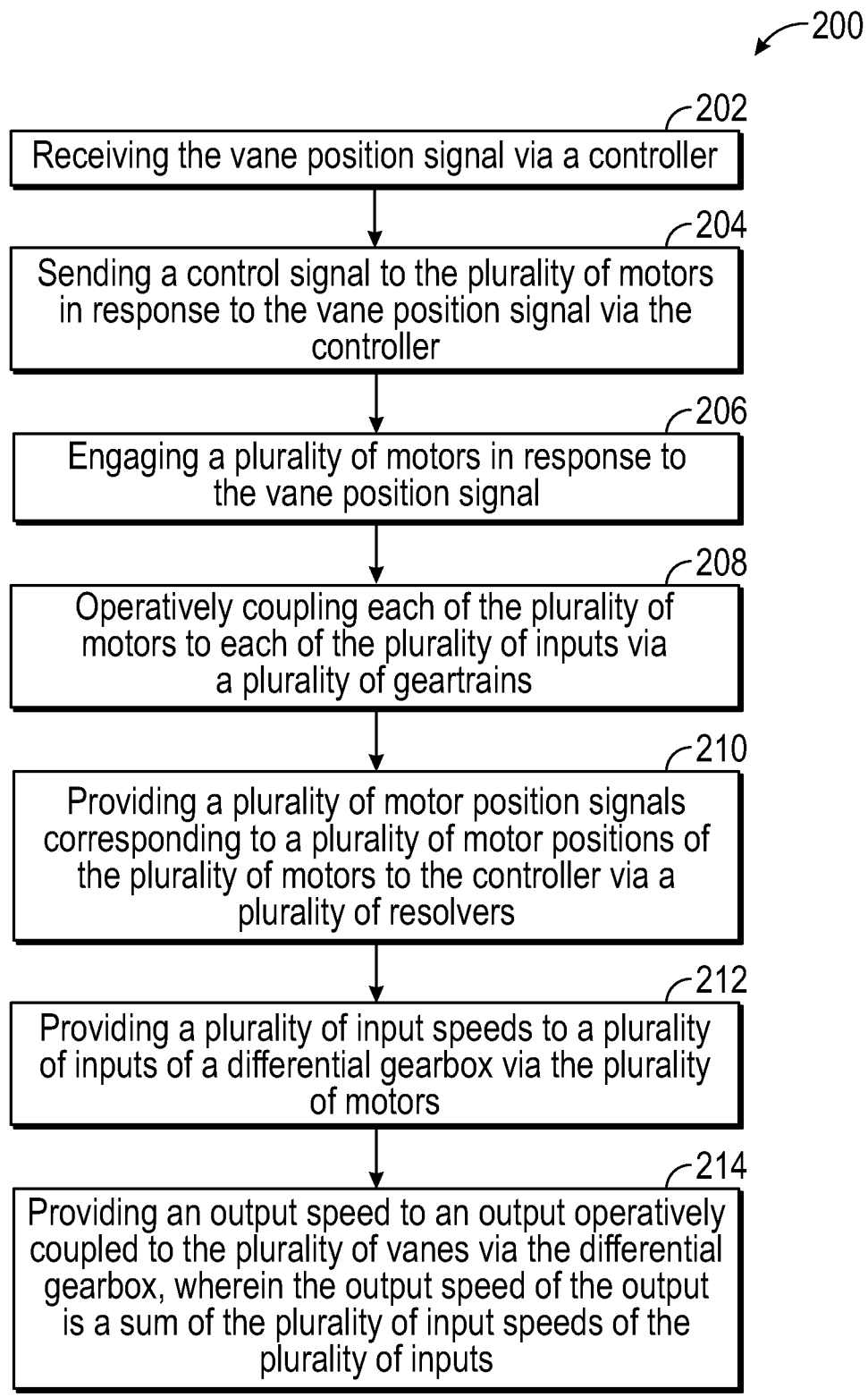
FIG. 2 is a flowchart illustrating a method of actuating vanes within a turbine.

Referring to FIG. 2, a method 200 for controlling a plurality of vanes within a turbine engine is shown. In operation 202, a vane position sensor determines a position of at least one vane. The vane position sensor provides a signal to a controller, such as a FADEC or other suitable controller. The controller receives the vane position signal.

In operation 204, the FADEC or other suitable controller sends a signal to a motor power switching and control to send a control signal to a motor in response to the vane position signal.

In operation 206, motor power switching and control unit engages the motors in accordance with the desired vane position state. The engaged motors can provide a selected speed, direction of rotation, braking force, etc.

In operation 208, in certain embodiments, the motors are operatively coupled with the inputs of a differential gearbox via a respective plurality of geartrains.

In operation 210, a resolver associated with each motor can provide a motor position signal corresponding to the motor position of each motor to the controller to determine the shaft state of each motor to determine if the state is within operational bounds.

In operation 212, the engaged plurality of motors provide rotational input to the inputs of the differential gearbox.

In operation 214, the differential gearbox sums speeds of inputs provided by the plurality of motors via planetary gearbox together to output an output speed that is the sum of the plurality of input speeds. The summed output can be sent to a vane actuation system to actuate the vane synchronization ring to actuate the vanes as desired.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An actuation system to control a plurality of vanes disposed within a turbine engine, wherein a vane position sensor provides a vane position signal corresponding to a vane position of the plurality of vanes, the actuation system comprising:
   first and second redundant actuators respectively comprising parallel first and second redundant actuation systems and a differential gearbox,
   each of the parallel first and second redundant actuation systems respectively comprising:
   a motor engaged in response to the vane position signal; and
   a brake,
   the differential gearboxes respectively having an input operatively coupled to the motor of each of the parallel first and second redundant actuation systems and an output operatively coupled to the plurality of vanes, wherein an output speed of the output is a sum of input speeds of each input,
   the brake of each of the parallel first and second redundant actuation systems being disposed to selectively prevent the corresponding motor from inputting speed to the corresponding differential gearbox when the corresponding motor fails.

2. The actuation system of claim 1, wherein the motor of each of the parallel first and second redundant actuation systems is an electrical motor.

3. The actuation system of claim 1, further comprising a controller to receive the vane position signal and to send a control signal to the motor of each of the parallel first and second redundant actuation systems in response to the vane position signal.

4. The actuation system of claim 3, wherein each of the parallel first and second redundant actuation systems further comprises a resolver to provide a plurality of motor position signals corresponding to a plurality of motor positions of the corresponding motor to the controller.

5. The actuation system of claim 1, wherein each of the parallel first and second redundant actuation systems further comprises a geartrain operatively coupling the corresponding motor to the corresponding input.

6. A method for controlling a plurality of vanes disposed within a turbine engine, wherein a vane position signal corresponding to a vane position of the plurality of vanes is provided via a vane position sensor, the method comprising:
   providing first and second redundant actuators, each of the first and second redundant actuators respectively comprising parallel first and second redundant actuation systems and a differential gearbox;
   engaging a motor of each of the parallel first and second redundant actuation systems in response to the vane position signal;
   providing an input speed from each motor of each of the parallel first and second redundant actuation systems to an input of the corresponding differential gearbox;
   providing an output speed to an output operatively coupled to the plurality of vanes of each of the differential gearboxes, wherein the output speed of the output is a sum of the corresponding input speeds of the corresponding inputs; and engaging a brake of each of the parallel first and second redundant actuation systems to prevent the corresponding motor from providing the corresponding input speed to the corresponding input.

7. The method of claim 6, wherein the motor of each of the parallel first and second redundant actuation systems is an electrical motor.

8. The method of claim 6, further comprising:

receiving the vane position signal via a controller; and sending a control signal to the motor of each of the parallel first and second redundant actuation systems in response to the vane position signal via the controller.

9. The method of claim 8, further comprising providing a plurality of motor position signals corresponding to a plurality of motor positions of the motor of each of the parallel first and second redundant actuation systems to the controller via a resolver of each of the parallel first and second redundant actuation systems.

10. The method of claim 6, further comprising operatively coupling the motor of each of the parallel first and second redundant actuation systems to the corresponding input via a geartrain of each of the parallel first and second redundant actuation systems.

11. A multiple redundant actuation system to control a plurality of vanes disposed within a turbine engine, wherein a vane position sensor provides a vane position signal corresponding to a vane position of the plurality of vanes, the multiple redundant actuation system comprising:

multiple redundant actuators, wherein each redundant actuator comprises a plurality of parallel actuation systems and a differential gearbox, wherein each actuation system comprises:

a motor engaged in response to the vane position signal; and a brake, the differential gearbox of each redundant actuator having a plurality of inputs operatively coupled to the corresponding plurality of motors and an output operatively coupled to the plurality of vanes, wherein an output speed of the output is a sum of a plurality of input speeds of the plurality of inputs, and the brake of each actuation system of each redundant actuator is disposed to selectively prevent the corresponding motor from inputting speed to the corresponding differential gearbox when the corresponding motor fails.

12. The multiple redundant actuation system of claim 11, wherein each motor is an electrical motor.

13. The multiple redundant actuation system of claim 11, wherein each actuation system further comprises a controller to receive the vane position signal and to send a control signal to the motor in response to the vane position signal.

14. The multiple redundant actuation system of claim 13, wherein each actuation system further comprises a resolver to provide a plurality of motor position signals corresponding to a plurality of motor positions of the corresponding motor to the controller.

15. The multiple redundant actuation system of claim 11, wherein each actuation system further comprises a geartrain operatively coupling the corresponding motor to the corresponding input.

* * * * *